TRANSISTOR TESTING APPARATUS

Filed April 15, 1954 2 Sheets-Sheet 1

BASIC CIRCUIT

INVENTORS
Donovan V. Geppert
BY Russell R. Yost Jr.
Mueller & Aichele
Attys.

July 16, 1957 D. V. GEPPERT ET AL 2,799,827

TRANSISTOR TESTING APPARATUS

Filed April 15, 1954 2 Sheets-Sheet 2

INVENTORS
Donovan V. Geppert
Russell R. Yost Jr.
BY
Mueller & Aichele
Attys.

United States Patent Office 2,799,827

Patented July 16, 1957

2,799,827

TRANSISTOR TESTING APPARATUS

Donovan V. Geppert and Russel R. Yost, Jr., Phoenix, Ariz., assignors to Motorola, Inc., Chicago, Ill., a corporation of Illinois Application April 15, 1954, Serial No. 423,298

5 Claims. (Cl. 324—158)

The present invention relates generally to testing or measuring apparatus for transistor units, and more particularly to an improved testing apparatus for measuring the "alpha" or "short circuit current gain" cutoff frequency of a transistor.

The upper frequency limit of a transistor above which its gain drops to an unusable level, is clearly an important characteristic of any particular transistor, and it is most desirable that this limit be determined for any unit that is to be used for transistor purposes. This applies, not only for experimental laboratory models, but also in establishing routine tests on a production basis to insure that transistors constructed in the ordinary course of manufacture are suited, in each instance, to their intended purpose and will operate in the frequency range for which they are constructed.

A transistor exhibits in addiiton to a current gain cutoff frequency, a voltage gain cutoff frequency and a power gain cutoff frequency. However, both the latter gain cutoff frequencies are a function (among other things) of the current gain cutoff frequency. In other words, the current gain cutoff frequency is the fundamental parameter and the one that should be measured. In practice, the load impedance in the collector circuit of the transistor is relatively low, and measurements of the current gain cutoff frequency are usually conducted with the collector essentially grounded. The resulting measurement is, therefore, actually the short circuit current gain cutoff frequency, and this is referred to generally in the art as the "alpha cutoff frequency" of the transistor.

Theoretically, the current gain amplification factor of a transistor is expressed as:

$$\alpha=\left.\frac{\partial i_c}{\partial i_e}\right]_{e_c \text{ constant}}$$

where:

$\alpha$—current gain amplification factor
$i_c$—collector current
$i_e$—emitter current
$e_c$—collector bias.

The current gain of transistor units drops to an unusable value as the frequency of an applied signal is increased beyond a certain range. A "figure of merit" for high frequency performance is the "alpha cutoff frequency" which is defined as the frequency at which the current gain amplification factor of the transistor drops to $$\frac{1}{\sqrt{2}}$$

or .707 its low frequency value.

It is, accordingly, an object of the present invention to provide an improved testing apparatus for measuring the alpha cutoff frequency of a transistor in an accurate, simple and convenient manner.

Another object of the invention is to provide such improved apparatus for measuring the alpha cutoff frequency of a transistor unit that is relatively simple to construct and utilizes readily available components, and which operates with speed and precision accurately to determine this characteristic.

A feature of the invention is the provision of an improved testing apparatus for measuring the alpha cutoff frequency of a transistor that is constructed so that extraneous capacitive effects which produce errors in the measurement are reduced to a minimum.

Another feature of the invention is the provision of such improved measuring apparatus that is constructed so that the various components thereof are operated through ranges at which such components exhibit their highest degree of accuracy.

Another feature of the invention is the provision of such improved measuring apparatus in which high frequency measurements are effected by interrupting a high frequency carrier at a relatively low repetition frequency, and by detecting the interrupted carrier to obtain pulses having a relatively low repetition rate and having an amplitude corresponding to that of the carrier. This expedient enables simple and readily available low frequency measuring instruments to be used for a measurement of the amplitude of the high frequency carrier by measuring the amplitude of the relatively low frequency pulses.

Yet another feature of the invention is the provision of such improved measuring apparatus in which the amplitude of a test signal applied thereto is maintained constant automatically as the test signal is varied throughout a frequency range whose upper limit exceeds the alpha cutoff frequency of the transistor.

Another feature of the invention is the provision of such improved measuring apparatus in which the applied testing signal is interrupted at a low frequency rate, as mentioned above, as it is varied through the frequency range, and in which means is provided for maintaining the output signal of the transistor at a substantially constant amplitude even at the alpha cutoff frequency so that the efficiency of a detector means in the output circuit is not impaired and an accurate measurement of the alpha cutoff frequency may be obtained.

The above and other features of the invention which are believed to be new are set forth with particularity in the appended claims. The invention itself, however, together with further objects and advantages thereof, may best be understood by reference to the following description when taken in conjunction with the accompanying drawing in which:

The present invention provides apparatus for measuring the alpha cutoff frequency of a transistor or the like, the transistor having emitter, collector and base electrodes. The apparatus comprises an input circuit adapted to be connected between the emitter electrode of a transistor to be tested and the base electrode thereof. The input circuit includes impedance means across which signals applied to the input circuit appear. A variable frequency signal source is coupled to the input circuit for applying a signal thereto which is variable through a selected frequency range exceeding the alpha cutoff frequency of the transistors to be tested. A modulator is coupled to the signal source for interrupting the variable frequency signal at a relatively low frequency rate as compared with the high frequency signal itself. Means including a detector is coupled to the impedance means for producing pulses recurring at the relatively low interrupting frequency and with an amplitude corresponding to the amplitude of the variable frequency signal, these pulses being used to obtain an indication of the amplitude of the variable frequency signal. An output circuit including a second impedance means is adapted to be connected between the collector electrode of the transistor and the base electrode thereof for deriving the interrupted variable frequency signal upon translation thereof through the transistor, which signal appears across the second impedance means. Means including a second detector is coupled to the second impedance means for deriving pulses recurring at the interruption frequency and having an amplitude corresponding to the derived signal. These latter pulses are used to provide an indication of the amplitude of the derived signal.

Figure 1:
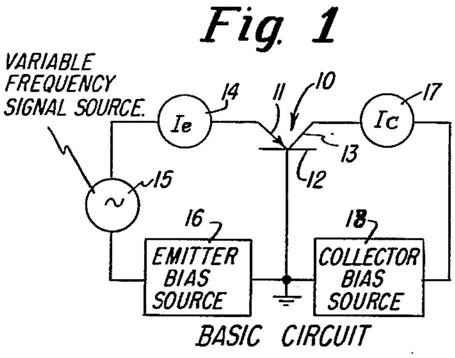
Fig. 1 is a basic circuit for measuring the alpha cutoff frequency of a transistor.

Referring now to the drawings and in particular to Fig. 1, the basic testing circuit illustrated therein includes a transistor 10 under test, and which has an emitter electrode 11, a base electrode 12 and a collector electrode 13. The base electrode 12 is connected to a point of reference potential or ground; and the emitter electrode 11 is connected to this point through an alternating current microammeter 14, through a variable frequency signal source 15, and through an emitter unidirectional biasing potential source 16. The collector electrode 13 is connected to the point of reference potential through a microammeter 17 and through a collector unidirectional biasing potential source 18.

By the circuit of Fig. 1, the current gain of the transistor 10 can be measured by taking the ratio of the readings of microammeters 17 and 14 for any selected frequency of the signal from source 15. In order to measure the alpha cutoff frequency of the transistor, it is merely necessary to maintain the amplitude of the signal from source 15 constant and vary the frequency thereof until the amplitude of the output signal as indicated by meter 17, drops to .707 times its normal value. The frequency at which this occurs is the gain cutoff frequency, and this frequency can be indicated by a suitable calibration of source 15.

Microammeters are required in this circuit owing to the necessity of keeping the signal current through the transistor extremely low in order to maintain the operation thereof essentially linear. The bias potential sources 16, 18 can be constructed to exhibit negligible impedance at the frequency of the signal current at which the measurement is made.

Figure 2:
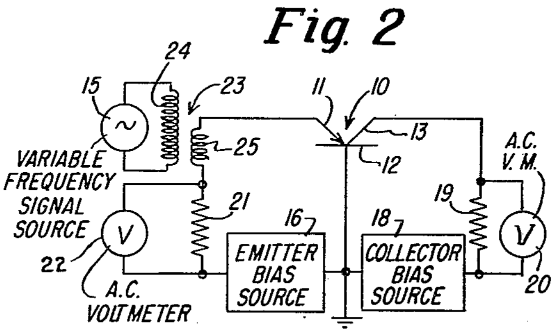
Fig. 2 is a modification of the circuit of Fig. 1 to obviate undesired capacitive effects.

While the above method for testing the alpha cutoff frequency of the transistor is theoretically possible, many difficulties render this method infeasible. Suitable alternating current microammeters with adequate high frequency response are not readily available, so that it is necessary to replace them with more accurate resistor-voltmeter combinations. Such a modification, however, is also subject to limitations in the basic circuit due to the capacitive shunting effect between the resistor-voltmeter combination in the emitter circuit and the point of reference potential. If the positions of the signal source 15 and that resistor-voltmeter combination are interchanged, this capacitive shunting effect is overcome. However, the capacitance between the source 15 and ground now must be overcome, and this can be accomplished by inductive coupling. Therefore, the basic circuit of Fig. 1 must be modified, and such modification is shown in the more practical circuit of Fig. 2.

In the latter circuit, microammeter 17 is replaced by a resistor 19 shunted by an alternating-current voltmeter 20. There is no problem of a capacitive shunting effect by this resistor-voltmeter combination since one side thereof is effectively connected to ground through bias source 18 which has negligible impedance at the relatively high signal frequencies adjacent the alpha cutoff frequency which is to be measured. Microammeter 14 is replaced by a resistor 21 shunted by an alternating-current voltmeter 22 in the circuit of emitter 11. Since one side of this latter resistor-voltmeter combination is effectively connected to ground at the relatively high signal frequencies through source 16, it does not exhibit any undesired capacitive shunting effect. Likewise, the capacitive shunting effect of source 15 is removed by coupling it into the emitter circuit through a transformer 23, the transformer having a primary winding 25 connected to the source and a secondary winding 25 interposed between resistor 21 and emitter 11.

In the same manner as in Fig. 1, the frequency of the signal from source 15 is varied to obtain an indication of the alpha cutoff frequency of the transistor under test. It is desirable that the values of resistors 19 and 21 be as large as possible in order to yield a sufficiently high signal voltage. However, even though at low frequencies the value of resistor 21 can theoretically be made relatively high, the value of resistor 19 must be low compared with the output impedance of the transistor so that the collector potential may be maintained essentially constant throughout each cycle of the signal currents. For example, for collector impedances of the order of 5,000 ohms, a value for resistor 19 of 100 ohms induces negligible error.

At very high frequencies, of the order of tens or hundreds of megacycles, the values of both resistors 19, 21 must be low compared with the reactance of unavoidable stray capacitive effects between the emitter and collector circuits and ground. It is most desirable that these stray capacitive effects be reduced as much as possible, so that the resistors 19 and 21 can have relatively high values; for the greater the stray capacitive reactance, the less the value these resistors must have to overcome the effects thereof.

As stated in the description of Fig. 1, it is desirable that the signal currents through the transistor be maintained relatively low to permit essentially linear operation thereof. These currents should be of the order of 100 microamperes, and when resistors 19, 21 have a value of 100 ohms, the required sensitivity of voltmeters, 20, 22 is 10 millivolts. High frequency voltmeters of such sensitivity are not readily available, and the circuit of Fig. 3 has been devised to overcome this disadvantage.

Figure 3:
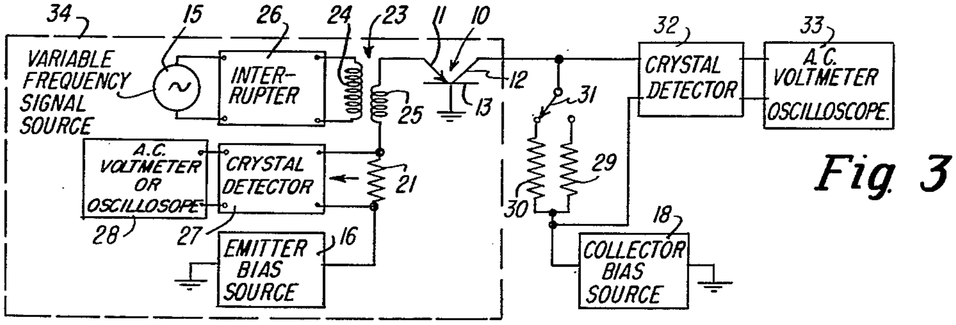
Fig. 3 is a further modification of the circuit of Fig. 1 and employs a technique which enables low frequency indicating devices accurately to indicate a high frequency signal.

In the circuit of Fig. 3, an interrupter 26 is coupled to source 15; a crystal detector 27 is connected across resistor 21 in place of voltmeter 22, and the detector is coupled to an alternating-current voltmeter or oscilloscope 28. Resistor 19 is replaced by a pair of resistors 29, 30 which are selectively connected into the collector circuit by a single-pole—double-throw selecting switch 31; and voltmeter 20 is replaced by a crystal detector 32 which is connected to an alternating-current voltmeter or oscilloscope 33.

In the latter circuit, instead of supplying a steady unmodulated signal from source 15 to the circuit of emitter 11, the signal is keyed on and off at a low frequency rate of, for example, 100 C. P. S. The crystal detectors, unlike the voltmeters 20, 22, can be made to respond to frequencies up to several hundred megacycles and these will produce 100 C. P. S. square waves or pulses in response to the interrupted signal. These pulses have an amplitude corresponding to the amplitude of the interrupted signal, and can easily be measured by any convenient and readily available alternating current voltmeter or oscilloscope, such as designated 28 and 33 to provide an indication of the amplitude of the variable frequency signal, which is desired.

However, the crystal detectors exhibit nonlinear characteristics at low signal levels, and it is, therefore, desirable that the actual signal level in the collector detector 32 be substantially the same at the alpha cutoff frequency as at the low frequencies to avoid errors. This is accomplished in the circuit of Fig. 3 by the provision of resistors 29, 30, the value of resistor 29 being $\sqrt{2}$ or 1.414 times the value of resistor 30. Switch 31 is first connected to resistor 30 and, as in the case of the previous embodiments, the signal source is varied from a low to a high frequency and the readings for the collector current are noted with the emitter current maintained constant. As the alpha cutoff frequency is approached with the resulting tendency for the collector current to drop, switch 31 is connected to resistor 29, and the frequency of source 15 is raised until the reading of voltmeter 33 drops to the low frequency reading obtained when resistor 30 was in the circuit. The frequency at this point is the alpha cutoff frequency. This insures that the signal level in collector detector 32 is the same at the alpha cutoff frequency as at the lower frequencies, so that the nonlinear characteristics of the detector for low amplitude signals do not affect the correct reading of the alpha cutoff frequency.

It can be seen that it is desirable for the amplitude of the input signal to the transistor to be maintained constant throughout the test, so that the alpha cutoff frequency can be determined when the amplitude of the output signal drops to a selected level. However, even if source 15 and transformer 23 could be made to have a flat frequency response characteristic, the input impedance of transistor 10 varies with frequency owing to the variations of its gain with frequency, and thus causes the emitter signal current to vary with frequency. This latter factor, coupled with the inherent change in the response of the source and transformer with frequency, necessitates a control over the magnitude of the emitter signal current so that it may be maintained constant throughout the frequency range. One suitable control is the provision of a manual coupling adjustment on transformer 23, or this can be achieved automatically by the circuit of Fig. 4.

Figure 4:
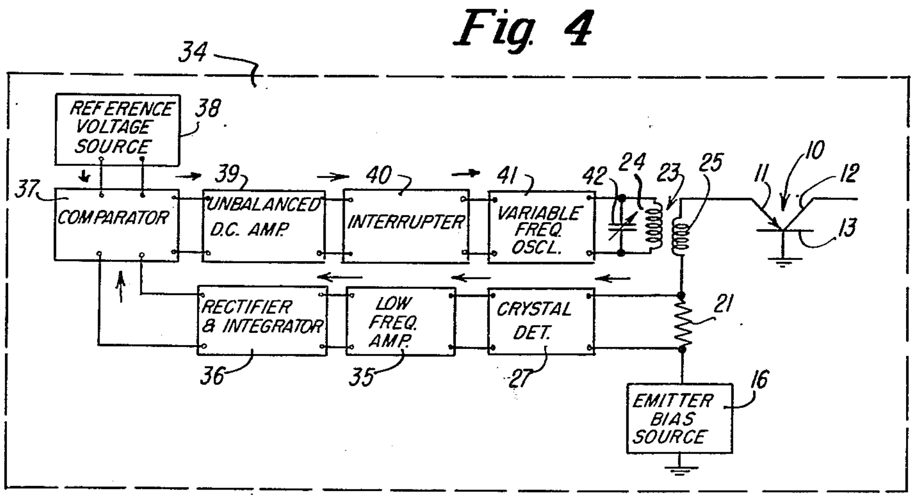
Fig. 4 is a schematic representation of a further modification of the invention.

The arrangement of Fig. 4 is intended to replace those units of Fig. 3 enclosed by the dashed line rectangle 34. In the circuit of Fig. 4, detector 27 is coupled to a low frequency amplifier 35 which, in turn, is coupled through a rectifier and integrator unit 36 to a comparator 37. A uni-directional reference voltage source 38 is also connected to comparator 37, the latter having output terminals connected to a direct current amplifier 39. Amplifier 39 is coupled through an interrupter 40 to a variable frequency oscillator 41. Oscillator 41 may be a simple one-tube oscillator using the primary winding 24 of transformer 23, in conjunction with a shunting variable capacitor 42, as its frequency determining network.

In the latter circuit, the detected square wave from detector 27 is amplified in amplifier 35 and passed through unit 36 to produce a uni-directional control potential having an amplitude corresponding to the amplitude of the detected square wave. The uni-directional control potential is compared in unit 37 with a reference voltage from source 38 to produce a potential that varies from zero in a positive or negative direction as the amplitude of the signals across resistor 21 vary in either direction from a desired constant amplitude value. The potential from the comparator is amplified in direct current amplifier 39 and applied through interrupter 40 to the anode of the tube of oscillator 41. The interrupter keys this potential at the desired modulating rate so that the oscillator is keyed at this rate and produces the desired interrupted variable frequency signal. Amplifier 39 is of the unbalanced type so that it applies a positive reference potential through interrupter 40 to the anode of the oscillator tube when the output from the comparator is zero. This positive reference potential varies in an increasing or decreasing direction as the potential from the comparator varies positively or negatively from zero in response to amplitude changes of the signals across resistor 21 in either direction from the desired amplitude value. Any variation in the amplitude of the potential applied to the anode of the oscillator tube produces a corresponding change in the amplitude of the interrupted signal produced thereby, and the arrangement is such that the amplitude of the emitter signal applied to the transistor is maintained essentially constant.

Figure 5:
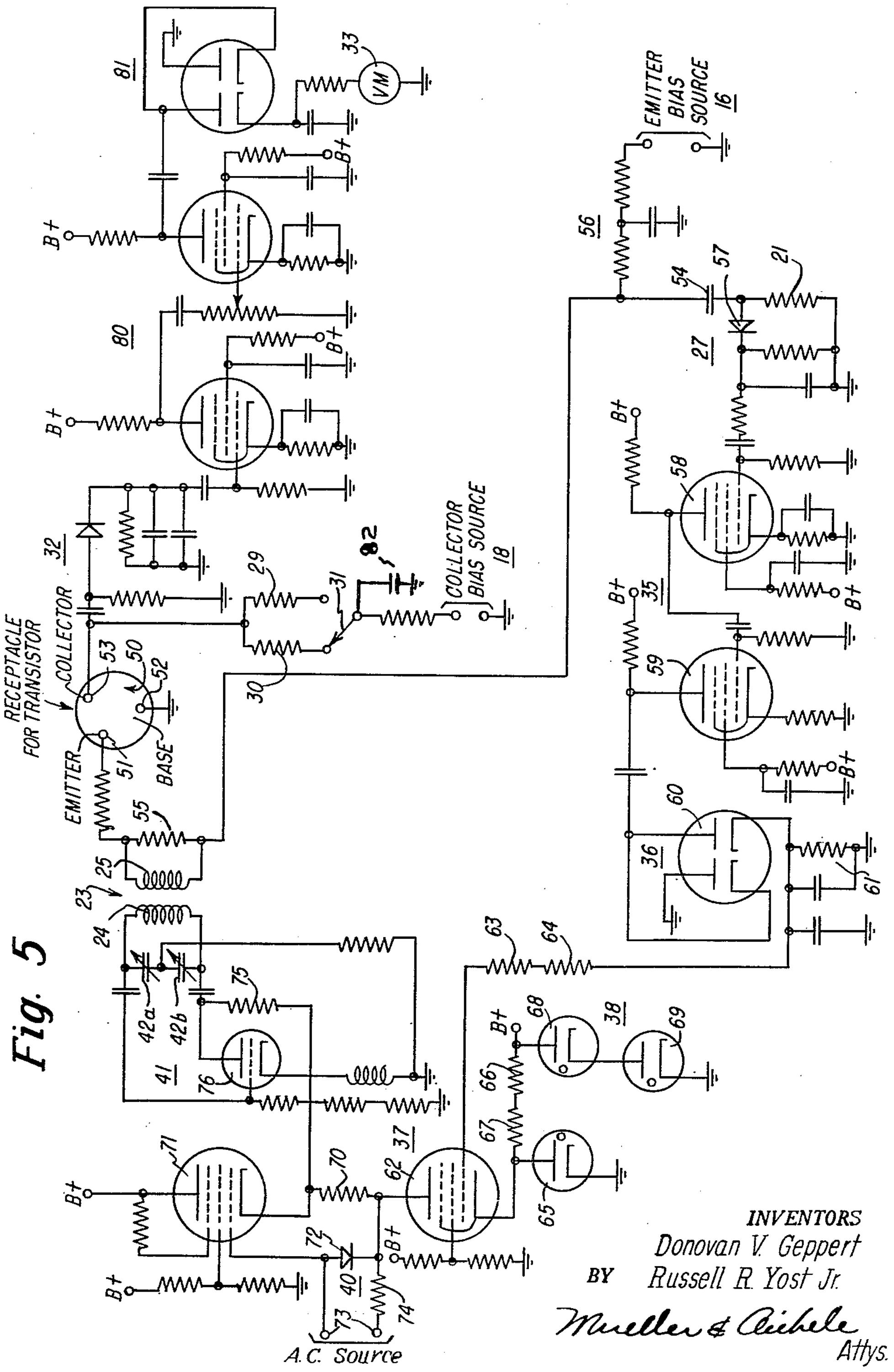
Fig. 5 is a detailed circuit diagram of the invention incorporating the modification of Fig. 4.

The system of Fig. 5 includes a receptacle 50 for receiving the transistor under test, and the receptacle has connectors 51, 52, 53 adapted to contact the emitter, base and collector electrodes respectively of the transistor. Connector 52 is connected to ground; and connector 51 is connected through winding 25, a capacitor 54 and resistor 21 to ground, winding 25 of transformer 23 and resistor 21 having been referred to previously in the description of the other figures. In this instance, winding 25 is shunted by a damping resistor 55, and the emitter bias source is connected to the junction of resistor 55 and capacitor 54 through a filter network indicated generally as 56.

Detector 27 is connected across resistor 21 and includes a crystal rectifier 57. The crystal rectifier is coupled to the low frequency amplifier 35 through a conventional coupling network, amplifier 35 comprising two cascaded stages 58, 59. Stage 59 is coupled to the rectifier and integrator stage 36, the latter stage including a double rectifier 60 connected so that the rectified and integrated signal appears with positive polarity with respect to ground across the resistance-capacity network 61 which is connected between the cathode of one of the rectifiers 60 and ground. The cathode side of network 61 is connected to the control electrode of a discharge device 62 through a pair of limiting resistors 63, 64. The cathode of device 62 is connected to ground through a ballast tube 65, and the cathode is further connected to the positive terminal B+ through a pair of resistors 66, 67. The positive terminal B+ is connected to ground through a pair of series-connected ballast tubes 68, 69. The elements 65—69 constitute the reference voltage source 38 referred to in Fig. 4.

Device 62 functions as the D. C. amplifier 39, and its anode is connected through a resistor 70 to the cathode of an electron discharge device 71. The anode of device 71 is conected to the positive terminal B+, and its control electrode is connected to the anode of device 62 through a diode 72. The terminals 73 which are connected to an alternating current voltage source are connected through a resistor 74 across diode 72. The cathode of device 71 is connected through a resistor 75 to the anode of an electron discharge device 76. Device 76 is connected as a well-known variable frequency oscillator 41 and, as noted earlier herein, primary winding 24 of transformer 23 forms a component of the frequency determining circuit of the oscillator.

Capacitor *42a*, *42b* in the frequency determining network of oscillator 41 are adjusted so that an input signal of a selected frequency is impressed on the emitter of the transistor under test, this frequency being varied through a selected range, as previously described. As previously noted, this input signal is interrupted at a relatively low frequency rate, and the interrupted signal appears across resistor 21. The signal is detected in detector 27 which produces a pulse wave corresponding to the interruption frequency of the input signal. The pulse wave is amplified in the two stage amplifier 35 and rectified in device 60 of unit 36. The resulting positive going pulses are integrated in network 61, and a positive potential appears across this network having amplitude variations corresponding to variations in the amplitude of the input signal appearing across resistor 21. This positive potential is applied to the control electrode of device 62.

The reference voltage for the circuit is derived from across the ballast tubes 68, 69 which function to hold this voltage constant. Resistors 66, 67 and ballast tube 65 form a potentiometer across ballast tubes 68, 69, so that the cathode of device 62 is established at a constant reference voltage despite current variations in that device. The reference voltage on the cathode of device 62 is chosen to be greater than the positive potential applied to control electrode by unit 36, so that variations in that positive potential drive the control electrode between a lower limit in which device 62 is cut-off and an upper limit in which the potential of the control electrode is the same as the reference voltage on the cathode. During normal operation, the potential of the control electrode is intermediate these two limits and device 62 is conductive.

Device 71 is controlled by the relatively low frequency (60 cycle) signal impressed across terminals 73. Diode 72 prevents this signal from driving the control electrode of device 71 positive with respect to its cathode, but permits negative swings so that device 71 is periodically cut-off. Whenever device 71 is driven to cut-off, the plate voltage of the tube 76 in oscillator 41 drops to zero, and the oscillator signal is interrupted at a rate corresponding to the frequency of the signal impressed across terminals 73. When device 71 is conductive, on the other hand, positive voltage from the terminal B+ is supplied to the anode of tube 76 so that oscillations may be sustained in oscillator 41. The amplitude of the positive voltage supplied to the plate of tube 76, and the resulting amplitude of the oscillator signal, depends upon the conductivity of device 71 during its conducting intervals. This, in turn, depends upon device 62 which couples the cathode of device 71 to ground.

Therefore, any tendency for the amplitude of the signal across resistor 21 to vary, produces a corresponding variation in device 62 which, in turn, varies the conductivity of device 71 in such a direction that the potential applied to the plate of oscillator tube 76 changes in a direction to compensate for such tendency.

Connector 53 for receptacle 50 which receives the collector electrode of the transistor under test is connected through resistors 29, 30 and switch 31 to the collector bias source 18, as described in conjunction with Fig. 3. The arm of switch 31 is grounded for A.-C. currents through capacitor 82. Connector 53 is also coupled to detector 32 which, as previously described, recovers the low frequency interruption modulation signal of the collector signals. The low frequency signal is amplified in a two stage amplifier 80, and is applied to voltmeter 33 through a rectifier and integrator 81.

Therefore, in the manner previously described, the frequency of the input signal is increased until meter 33 starts to drop from its low frequency value. Switch 31 is then actuated, and the frequency of the input signal further increased until meter 33 reaches its previous low frequency indication. The frequency at which this occurs is the alpha cutoff frequency of the transistor under test.

The present invention provides, therefore, an extremely simple instrumentality that uses well-known and readily available components to measure the alpha cut-off frequency of a transistor in a rapid and extremely convenient manner. As previously noted, this instrumentality has great utility not only for laboratory tests of new transistor models, but also for routine factory checks.

While particular embodiments of the invention have been shown and described, modifications may be made, and it is intended on the appended claims to cover all such modifications as fall within the true spirit and scope of the invention.

We claim:

1. Apparatus for measuring the alpha cutoff frequency of a transistor and the like, which transistor has emitter, collector and base electrodes, said apparatus including in combination, first, second and third connectors for respective connection to the emitter, collector, and base electrodes of a transistor to be tested, an input circuit connected between said first and third connectors, a variable frequency signal source coupled to said input circuit for applying an input signal thereto variable through a selected frequency range exceeding the alpha cutoff frequency of the transistor; a modulator coupled to said signal source for interrupting said variable frequency signal at a relatively low repetition frequency as compared with the high frequency end of said selected frequency range; means including a detector coupled to said input circuit for detecting the interrupted signal to derive a signal indicating the amplitude of the input signal; an output circuit connected between said second and third connectors for deriving the interrupted variable frequency signal from the transistor, and means including a second detector included in said output circuit for detecting the signal derived from the transistor and for indicating the amplitude of the resulting detected signal.

2. Apparatus for measuring the alpha cutoff frequency of a transistor and the like, which transistor has emitter, collector and base electrodes, said apparatus including in combination, first, second and third connectors for respective connection to the emitter, collector and base electrodes of a transistor to be tested; an input circuit connected between said first and third connectors, said input circuit including impedance means across which signals applied to said input circuit appear; a variable frequency signal source coupled to said input circuit for applying a signal thereto variable through a selected frequency range exceeding the alpha cutoff frequency of the transistor; a modulator coupled to said signal source for interrupting said variable frequency signal at a relatively low repetition frequency as compared with the high frequency end of said selected frequency range; means including a detector coupled to said impedance means for detecting the interrupted signal and for providing an indication of the amplitude of the resulting detected signal; an output circuit connected between said second and third connectors for deriving the interrupted variable frequency signal from the transistor, said output circuit including a pair of resistors having predetermined relative values and means for selectively switching said resistors into said output circuit; and means including a second detector coupled to said output circuit for detecting the signal derived from the transistor and for indicating the amplitude of the resulting detected signal, said pair of resistors being selectively switched into said output circuit to maintain the modulated signal derived from the transistor at substantially the same amplitude at the alpha cutoff frequency as at the low frequency end of said selected frequency range.

3. Apparatus for measuring the alpha cutoff frequency of a transistor and the like, which transistor has emitter, collector and base electrodes, said apparatus including in combination, first, second and third connecetors for respective connection to the emitter, collector and base electrodes of a transistor to be tested; means for connecting said third connecetor to a point of reference potential; a transformer having a primary winding and a secondary winding, said secondary winding having one side connected to said first connector; a resistor means and a biasing potential source series-connected between the other side of said secondary winding and said point of reference potential; a variable frequency signal source coupled to said primary winding of said transformer to apply to the transistor a signal variable through a selected frequency range exceeding the alpha cutoff frequency of the transistor; means coupled to said variable frequency signal source for interrupting the signal developed thereby at a repetition frequency low compared with the high frequency end of said frequency range; a detector coupled across said resistor means for detecting the interrupted variable frequency signal; an indicating device coupled to said detector for providing an indication of the detected signal produced thereby; a second resistor means and a second biasing source connected in series between said second connector and said point of reference potential for deriving the interrupted variable frequency signal from the transistor; a second detector coupled across said second resistor means for detecting the interrupted signal from the transistor; and an indicating device coupled to said second detector for indicating the amplitude of the detected signal therefrom.

4. Apparatus for measuring the alpha cutoff frequency of a transistor and the like, which transistor has emitter, collector and base electrodes, said apparatus including in combination, first, second and third connectors for respective connection to the emitter, collector and base electrodes of a transistor to be tested; an input circuit connected between said first and third connectors, said input circuit including impedance means across which signals applied to said input circuit appear; a variable frequency signal source coupled to said input circuit for applying a signal to the transistor variable through a selected frequency range exceeding the alpha cutoff frequency of the transistor; a modulator coupled to said signal source for interrupting said variable frequency signal at a relatively low repetition frequency as compared with the high frequency end of said selected frequency range; a detector coupled to said impedance means for detecting the interrupted variable frequency signal applied to the transistor; a control network coupled to said detector and utilizing the resulting detected signal therefrom to control said signal source and maintain the amplitude of said variable frequency signal applied to the transistor essentially constant throughout said selected frequency range; an output circuit including a second impedance means connected between said second and third connectors for deriving the interrupted variable frequency signal from the transistor, with the derived signal appearing across said second impedance means; a second detector coupled across said second impedance means for detecting the signal appearing thereacross; and an indicating device coupled to said second detector for indicating the amplitude of the resulting detected signal therefrom.

5. Apparatus for measuring the alpha cutoff frequency of a transistor and the like, which transistor has emitter, collector and base electrodes, said apparatus including in combination, first, second and third connectors for respective connections to the emitter, collector and base electrodes of a transistor to be tested; means for connecting said third connector to a point of reference potential; a transformer having a primary winding and a secondary winding, said secondary winding having one side connected to said first connector; a resistor means and a biasing potential source series-connected between the other side of said secondary winding and said point of reference potential; a variable frequency signal source coupled to said primary winding of said transformer to apply a variable frequency signal to the transistor variable through a selected frequency range exceeding the alpha cutoff frequency of the transistor; means coupled to said variable frequency signal source for interrupting the signal developed thereby at a repetition frequency low compared with the high frequency end of said frequency range; a detector coupled across said resistor means for detecting the interrupted variable frequency signal; a control circuit coupled to said detector for utilizing the resulting detected signal therefrom to control said signal source and maintain the variable frequency signal applied to the transistor essentially constant throughout said selected frequency range; a second resistor means and a second biasing source connected in series between said second connector and said point of reference potential for deriving the interrupted variable frequency signal from the transistor; a second detector coupled across said second resistor means for detecting the signal from the transistor; and an indicating device coupled to said second detector for indicating the amplitude of the resulting detected signal therefrom.

References Cited in the file of this patent

UNITED STATES PATENTS 2,681,434 Wheeler -------------- June 15, 1954

FOREIGN PATENTS

"Principles of Transistor Circuits," Richard F. Shea, John Wiley & Sons, Inc., New York, copyright 1953, pages 488–490, 497–500.